United States Patent
Chinda et al.

(10) Patent No.: US 10,523,248 B2
(45) Date of Patent: Dec. 31, 2019

(54) RECEPTION DEVICE, RECEPTION METHOD, AND WIRELESS APPARATUS

(71) Applicants: FUJITSU TEN LIMITED, Kobe-shi, Hyogo (JP); TOYOTA JIDOSHA KABUSHIKI KAISHA, Toyota-shi, Aichi-ken (JP)

(72) Inventors: Takeshi Chinda, Kobe (JP); Kazushige Ogino, Kobe (JP); Naoki Kushima, Kobe (JP); Takuma Sawaya, Nagoya (JP)

(73) Assignees: FUJITSU TEN Limited, Kobe (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 15/699,787

(22) Filed: Sep. 8, 2017

(65) Prior Publication Data
US 2018/0091175 A1 Mar. 29, 2018

(30) Foreign Application Priority Data
Sep. 29, 2016 (JP) ................................. 2016-191149

(51) Int. Cl.
*H04B 1/00* (2006.01)
*H04W 52/52* (2009.01)
*H04W 72/04* (2009.01)

(52) U.S. Cl.
CPC .......... *H04B 1/0057* (2013.01); *H04W 52/52* (2013.01); *H04W 72/0453* (2013.01)

(58) Field of Classification Search
CPC ... H04B 1/0057; H04B 1/1036; H04W 52/52; H04W 72/0453
USPC ......................................................... 333/133
See application file for complete search history.

(56) References Cited

U.S. PATENT DOCUMENTS

| 6,891,954 B2* | 5/2005 | Takahashi | G10K 11/178 381/71.4 |
|---|---|---|---|
| 8,023,916 B2* | 9/2011 | Oe | H04B 1/126 375/346 |
| 2002/0097884 A1* | 7/2002 | Cairns | G10K 11/178 381/71.4 |
| 2007/0117529 A1 | 5/2007 | Oe | |

FOREIGN PATENT DOCUMENTS

| JP | H08-274663 A | 10/1996 |
|---|---|---|
| JP | 2007-142937 A | 6/2007 |
| JP | 2017-163263 A | 9/2017 |

\* cited by examiner

*Primary Examiner* — Robert J Pascal
*Assistant Examiner* — Kimberly E Glenn
(74) *Attorney, Agent, or Firm* — Oliff PLC

(57) ABSTRACT

A reception device according to an embodiment includes a main terminal, a sub-terminal, a demultiplexer, and a noise reducing unit. To the main terminal, a main signal is input. The main signal includes a broadcast wave. To the sub-terminal, a multiple signal is input. The multiple signal is obtained by multiplex a noise signal and a sub-signal including the broadcast wave. The demultiplexer demultiplexes the noise signal and the sub-signal from the multiple signal input from the sub-terminal. The noise reducing unit reduces a noise component included in the main signal by using the noise signal demultiplexed by the demultiplexer.

12 Claims, 7 Drawing Sheets

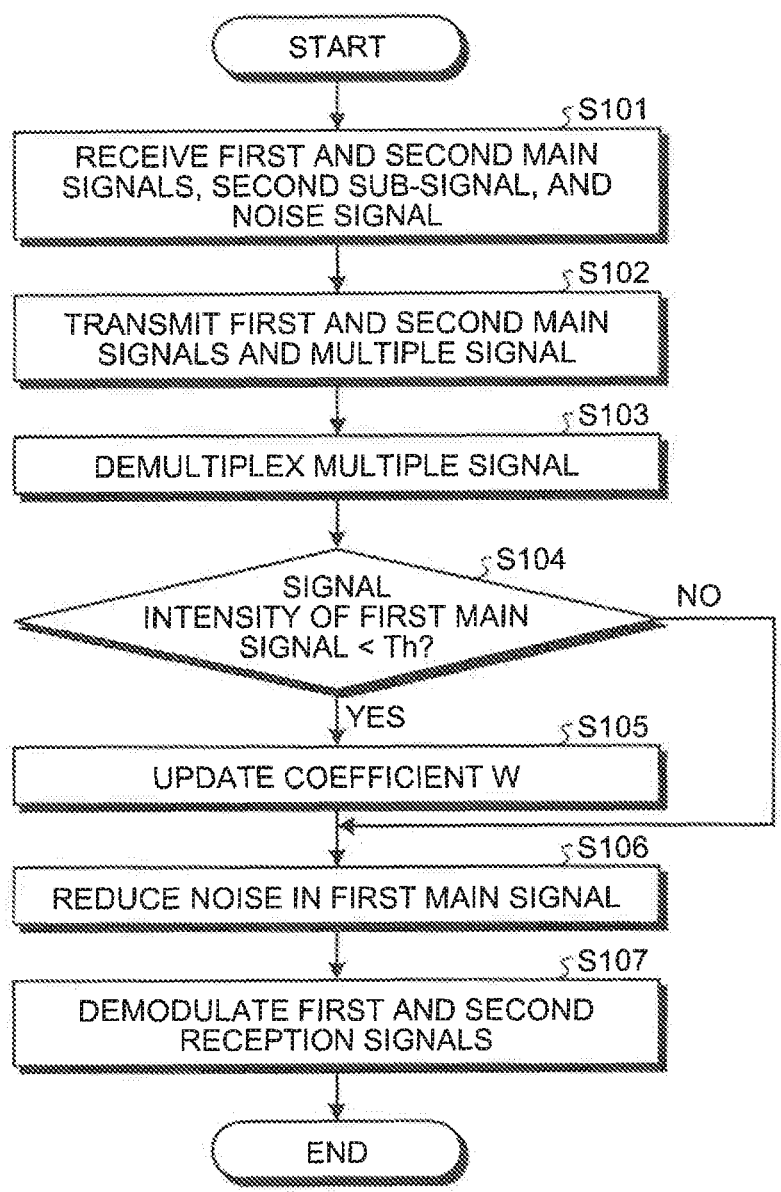

RECEPTION DEVICE, RECEPTION METHOD, AND WIRELESS APPARATUS

CROSS-REFERENCE TO RELATED APPLICATION

This application is based upon and claims the benefit of priority of the prior Japanese Patent Application No. 2016-191149, filed on Sep. 29, 2016, the entire contents of which are incorporated herein by reference.

FIELD

The embodiments discussed herein are directed to a reception device, a reception method, and a wireless apparatus.

BACKGROUND

Conventionally, there exists a device that has a function for reducing a noise generated from an inverter, a motor, etc. provided in an electric automobile or a hybrid automobile, as a device provided in this electric automobile or hybrid automobile to receive a radio broadcast, for example (see Japanese Laid-open Patent Publication No. 08-274663, for example).

However, a conventional device demodulates a reception signal on the basis of a signal received by using one antenna, and further performs a noise reducing process on the basis of a noise signal detected from this signal. In this manner, the conventional device reduces a noise on the basis of the signal received by using the one antenna, and thus the conventional technology has room for improvement in reduction accuracy of a noise.

SUMMARY

It is an object of the present invention to at least partially solve the problems in the conventional technology.

According to an aspect of the present disclosure, a reception device includes a main terminal, a sub-terminal, a demultiplexer, and a noise reducing unit. A main signal is input to the main terminal. The main signal includes a broadcast wave. A multiple signal is input to the sub-terminal. The multiple signal is obtained by multiplex a noise signal and a sub-signal including the broadcast wave. The demultiplexer demultiplexes the noise signal and the sub-signal from the multiple signal input from the sub-terminal. The noise reducing unit reduces a noise component included in the main signal by using the noise signal demultiplexed by the demultiplexer.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 3 is a flowchart illustrating a procedure for processes to be executed by the wireless apparatus according to the first embodiment;

DESCRIPTION OF EMBODIMENTS

1. First Embodiment

Hereinafter, embodiments of a reception device, a reception method, and a wireless apparatus will be described in detail with reference to the accompanying drawings. Moreover, the embodiments described below are merely one example, and not intended to limit the present disclosure.

1.1. Reception Method

Figure 1A:
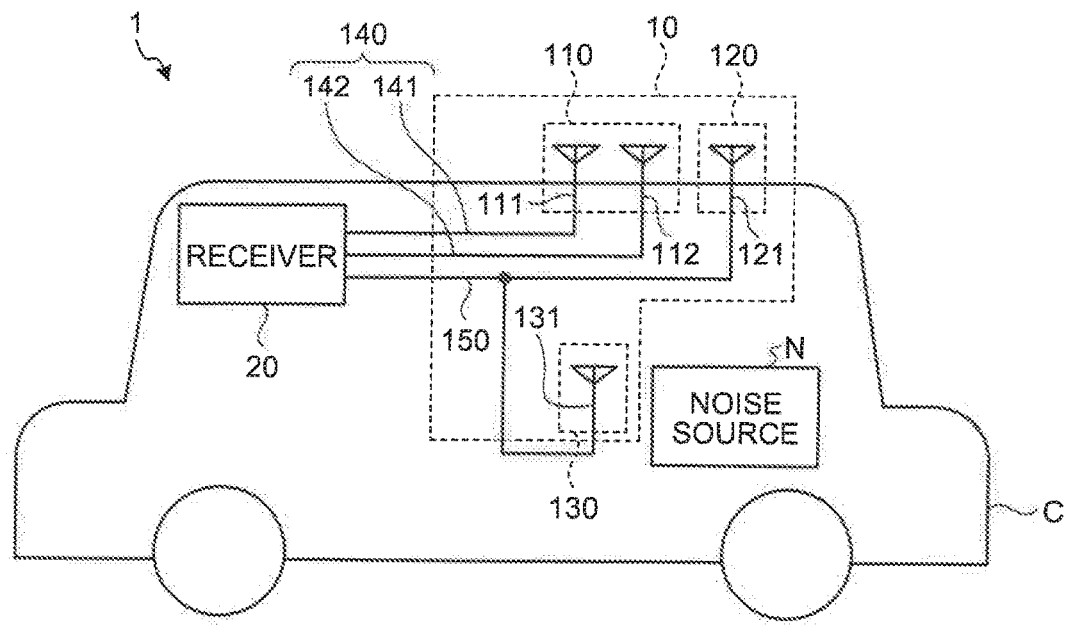
FIGS. 1A and 1B are diagrams illustrating a reception method according to a first embodiment.
Figure 1B:
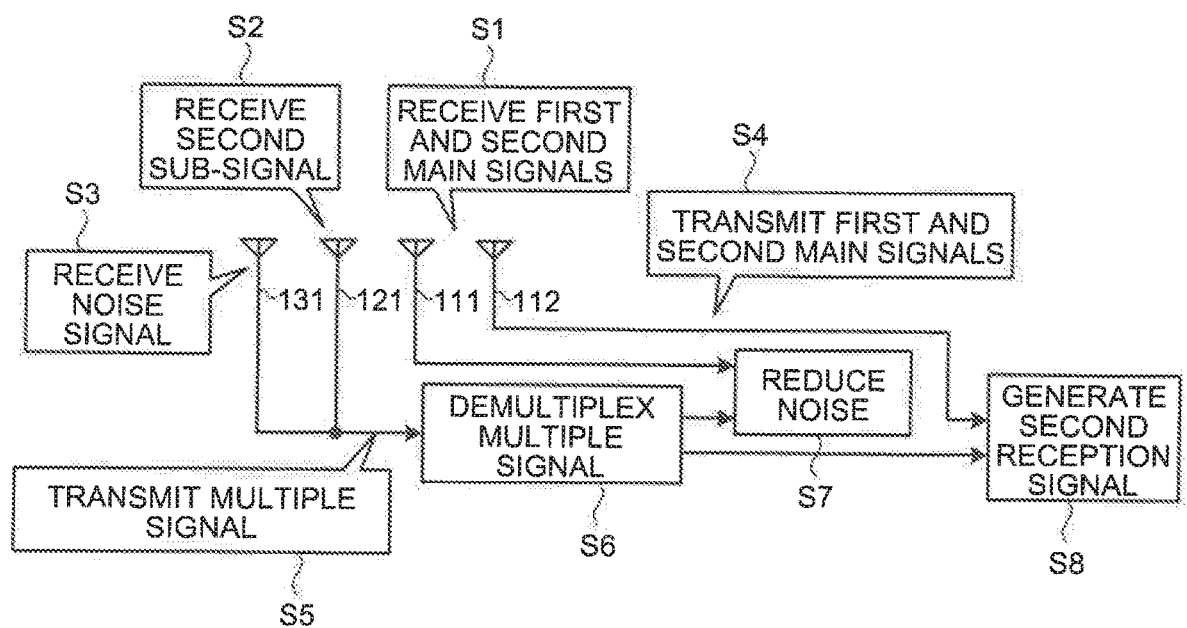

A reception method according to a first embodiment will be explained with reference to FIGS. 1A and 1B. FIGS. 1A and 1B are diagrams illustrating the reception method according to the first embodiment. The reception method according to the present embodiment is performed by a wireless apparatus 1 provided in a vehicle C such as an automobile, more preferably, an electric automobile and a hybrid automobile.

First, an outline of the wireless apparatus 1 will be explained with reference to FIG. 1A. FIG. 1A is a diagram illustrating an arrangement example of the wireless apparatus 1. As illustrated in FIG. 1A, the wireless apparatus 1 includes an antenna device 10 and a receiver 20. The antenna device 10 includes a main antenna unit 110 that receives, for example, a first main signal including a broadcast wave in a first frequency band such as an Amplitude-Modulation (AM) broadcast and a second main signal including a broadcast wave in a second frequency band, which is different form the first frequency band, such as a Frequency-Modulation (FM) broadcast.

In FIG. 1A, the main antenna unit 110 includes a first main antenna 111, which receives a first main signal, and a second main antenna 112 that receives a second main signal, for example. The main antenna unit 110 may include, for example, a broadband antenna (not illustrated) that can receive a broadband signal including the first and second frequency bands so as to receive the first and second main signals by using this broadband antenna.

The antenna device 10 includes a sub-antenna unit 120 including a sub-antenna 121 that receives a second sub-signal (hereinafter, may be simply referred to as "sub-signal") including the broadcast wave in the second frequency band. The first and second main antennas 111, 112 and the sub-antenna 121 are arranged at a position where the broadcast waves of the first and second frequency bands can be received, such as a vehicle body of the vehicle C.

The antenna device 10 includes an antenna unit 130 that receives a noise signal included in a first main signal. The antenna unit 130 includes an antenna 131 arranged in the vicinity of a noise source N that radiates a noise signal, such as an inverter and a motor of the vehicle C. In other words, the antenna 131 is a so-called noise picking-up antenna.

The antenna device 10 includes main-signal cables 140 that connect the main antenna unit 110 and the receiver 20 with each other. In the example illustrated in FIG. 1A, the main-signal cables 140 includes first and second main-signal cables 141, 142. The first main-signal cable 141 connects the first main antenna 111 and the receiver 20 with each other. The second main-signal cable 142 connects the second main antenna 112 and the receiver 20 with each other.

Moreover, the antenna device 10 includes a sub-signal cable 150 that connects the sub-antenna unit 120 and the antenna unit 130 with each other. The sub-signal cable 150 connects the sub-antenna 121 and the antenna 131 with the receiver 20.

Next, the reception method according to the present embodiment will be explained with reference to FIG. 1B. FIG. 1B is a diagram explaining the reception method to be executed by the wireless apparatus 1.

In the reception method illustrated in FIG. 1B, the wireless apparatus 1 receives first and second main signals through the first and second main antennas 111, 112 (Step S1). The wireless apparatus 1 receives a sub-signal through the sub-antenna 121 of the antenna device 10 (Step S2), and receives a noise signal through the antenna 131 (Step S3).

The antenna device 10 of the wireless apparatus 1 transmits the first and second main signals received by using the main antenna unit 110 to the receiver 20 through the main-signal cables 140 (Step S4). The first main signal is transmitted through the first main-signal cable 141, and the second main signal is transmitted through the second main cable 142.

The antenna device 10 transmits a multiple signal to the receiver 20 through the sub-signal cable 150 (Step S5). This multiple signal is obtained by multiplex the noise signal received by using the antenna unit 130 and the sub-signal received by using the sub-antenna unit 120.

Next, the receiver 20 of the wireless apparatus 1 demultiplexes the noise signal and the sub-signal from the multiple signal received through the sub-signal cable 150 (Step S6). The receiver 20 reduces the first main signal received through the main-signal cable 140 by the noise signal demultiplexed in Step S6 (Step S7) so as to generate a first reception signal.

The receiver 20 generates a second reception signal on the basis of the sub-signal demultiplexed in Step S6 and the second main signal received through the main-signal cable 140 (Step S8). Specifically, the receiver 20 synthesizes a signal, which is obtained by multiplying the sub-signal by a predetermined coefficient, and the second main signal so as to generate a second reception signal, for example.

In this manner, a noise signal included in a first main signal is received by using the antenna unit 130 arranged in the vicinity of the noise source N so as to reduce the first main signal by the received noise signal, whereby a noise component included in a first reception signal can be reduced more reliably, so that it is possible to improve reduction accuracy of a noise.

A sub-signal received by the sub-antenna unit 120 and a noise signal received by the antenna unit 130 are multiplied and transmitted, and thus reduction accuracy of a noise can be improved without additionally providing a cable for transmitting the noise signal. Moreover, a terminal to be connected with a cable for transmitting the noise signal is not to be additionally provided in the receiver 20, and thus reduction accuracy of a noise can be improved without enlarging the receiver 20.

In this manner, the reception method according to the present embodiment can improve reduction accuracy of a noise without additionally providing a cable of the antenna device 10 or a terminal of the receiver 20 so as to suppress enlargement of the wireless apparatus 1. Hereinafter, a detailed configuration of the wireless apparatus 1 will be explained.

1.2. Wireless Apparatus

Figure 2:
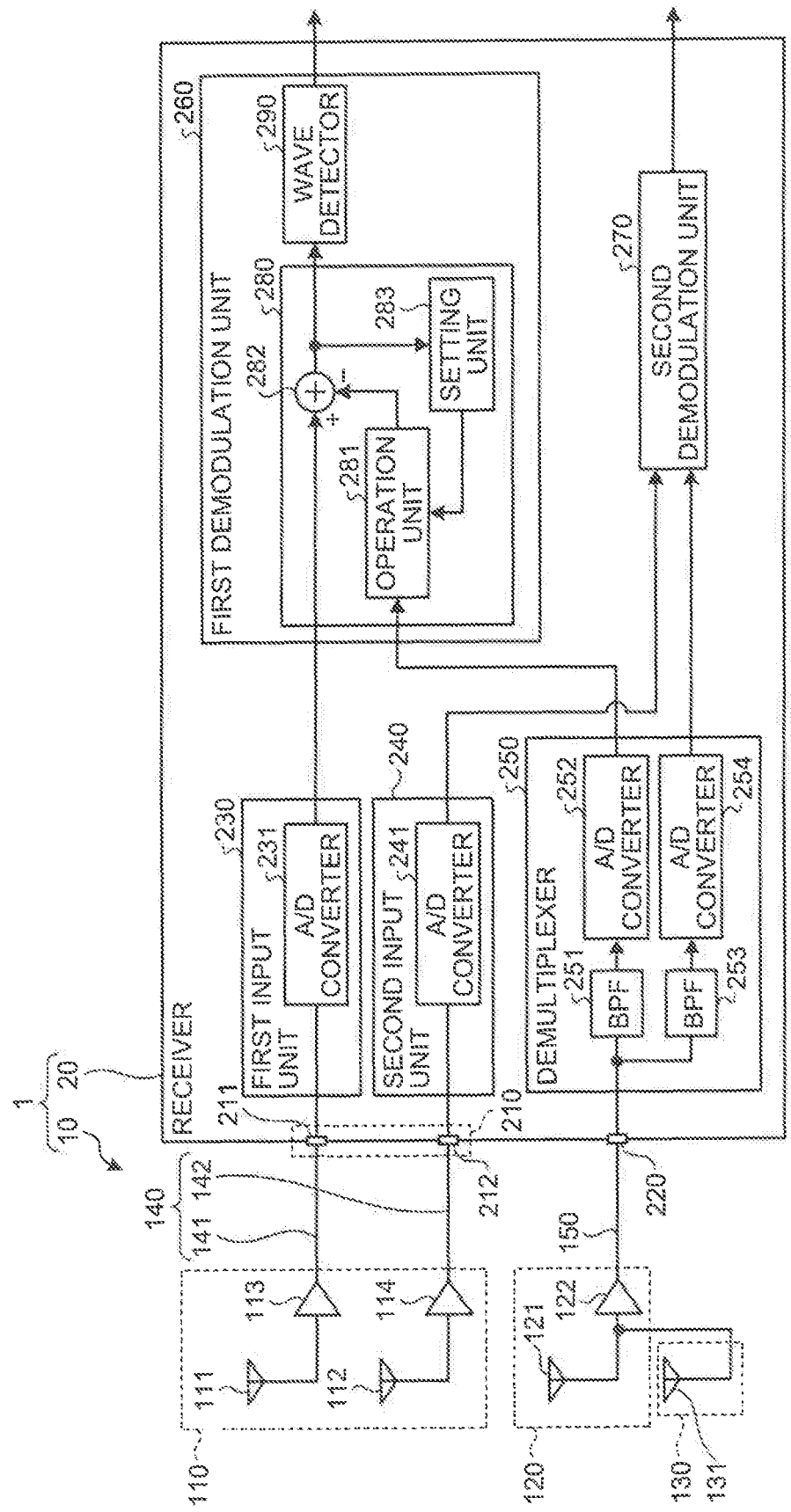
FIG. 2 is a diagram illustrating a configuration of a wireless apparatus according to the first embodiment.

FIG. 2 is a diagram illustrating a configuration of the wireless apparatus 1 according to the present embodiment. As illustrated in FIG. 2, the wireless apparatus 1 includes the antenna device 10 and the receiver 20.

1.2.1. Antenna Device

The antenna device 10 includes the main antenna unit 110, the sub-antenna unit 120, the antenna unit 130, the main-signal cables 140, and the sub-signal cable 150.

The main antenna unit 110 includes the first and second main antennas 111, 112 and first and second main amplifiers 113, 114. The first main antenna 111 receives, as a first main signal, a signal that includes a broadcast wave (for example, AM-broadcast wave) in the first frequency band. The second main antenna 112 receives, as a second main signal, a signal that includes a broadcast wave (for example, FM-broadcast wave) in the second frequency band that is different from the first frequency band, for example. The first main amplifier 113 amplifies the first main signal, and the second main amplifier 114 amplifies the second main signal.

The main-signal cables 140 include the first main-signal cable 141 and the second main-signal cable 142. The first main-signal cable 141 connects the first main amplifier 113 and the receiver 20 with each other. The first main-signal cable 141 transmits the first main signal amplified by the first main amplifier 113 to the receiver 20. The second main-signal cable 142 connects the second main amplifier 114 and the receiver 20 with each other. The second main-signal cable 142 transmits the second main signal amplified by the second main amplifier 114 to the receiver 20.

Here the first and second main signals are transmitted by the first and second main-signal cables 141, 142, respectively, however, not limited thereto. For example, a main multiple signal, obtained by multiplex the first and second main signals each other, may be transmitted to the receiver 20 by using the one main-signal cable 140. In this case, this main multiple signal may be amplified by an amplifier (not illustrated), for example. Thus, it is possible to reduce the number of amplifiers and that of cables.

Alternatively, the main antenna unit 110 may receive the first and second main signals by using a broadband antenna (not illustrated), for example. In this case, a signal received by the broadband antenna is configured to be amplified by one amplifier (not illustrated). The signal received by the broadband antenna is transmitted to the receiver 20 by using the main-signal cable 140 that is configured to be one cable, for example. Thus, it is possible to reduce the number of amplifiers and that of cables.

The sub-antenna unit 120 includes the sub-antenna 121 and a sub-amplifier 122. The sub-antenna 121 receives, as a second sub-signal, a signal that includes a broadcast wave in the second frequency band. The antenna unit 130 includes the antenna 131 that receives a noise signal included in the first main signal. To the sub-amplifier 122, the second sub-signal and the noise signal are input, for example. The sub-amplifier 122 amplifies a signal, obtained by multiplex the noise signal and the second sub-signal, so as to generate a multiple signal.

In this manner, the sub-amplifier 122 amplifies a sub-signal and a noise signal so as to generate a multiple signal, whereby the number of amplifiers can be reduced compared with a case where the second sub-signal and the noise signal are amplified individually. When the sub-signal and the noise signal are sufficiently strong, when a distance between the sub-antenna unit 120 and the receiver 20 is small, or the like, the sub-signal and noise signal may be multiplied without amplification by using a passive element such as a wave synthesizing unit.

The sub-signal cable 150 connects the sub-amplifier 122 and the receiver 20 with each other. The sub-signal cable 150 transmits a multiple signal generated by the sub-amplifier 122 to the receiver 20.

Meanwhile, arrangement examples of the antennas and amplifiers will be explained. Each of the first and second main antennas 111, 112 and the sub-antenna 121 is arranged at a position where a broadcast wave of first or second frequency band is easily received, such as an outside of a vehicle body of the vehicle C. The antenna 131 is arranged at a position, such as a position in the vicinity of a motor or an inverter, which is closer to the noise source N that radiates a noise signal than those at which the first and second main antennas 111, 112 of the main antenna unit 110 are arranged.

Thus, the antenna unit 130 mainly receives a noise signal, when a noise reducing process is executed by using the noise signal received by this antenna unit 130, reduction accuracy of a noise can be more improved.

The first and second main amplifiers 113, 114 are arranged between the receiver 20 and the respective first and second main antennas 111, 112 in the interior of the vehicle C, for example. The sub-amplifier 122 is arranged between the receiver 20 and the sub-antenna 121 in the interior of the vehicle C, for example.

Thus, signals, which are attenuated between the first and second main antennas 111, 112 and the respective first and second main amplifiers 113, 114, and a signal, which is attenuated between the sub-antenna 121 and the sub-amplifier 122, can be amplified to be transmitted to the receiver 20. In a case where the signal is amplified in consideration of an attenuation amount in transmission through each of the main-signal cables 140 or the sub-signal cable 150, even when the main antenna unit 110 or the sub-antenna unit 120 is far from the receiver 20, the received first or second main signal and the multiple signal can be transmitted more reliably.

1.2.2. Receiver

The receiver 20 includes a main terminal 210, a sub-terminal 220, a first input unit 230, a second input unit 240, a demultiplexer 250, a first demodulation unit 260, and a second demodulation unit 270.

The main terminal 210 includes a first main terminal 211 and a second main terminal 212. The first main terminal 211 is connected with the first main-signal cable 141. The second main terminal 212 is connected with the second main-signal cable 142. For example, when first and second main signals are transmitted through the one main-signal cable 140, the one main terminal 210 may be connected with this main-signal cable 140. The sub-terminal 220 is connected with the sub-signal cable 150.

Next, the first input unit 230 includes an Analog-to-Digital (A/D) converter 231, for example, and executes an A/D converting process and the like on a first main signal received through the first main terminal 211 so as to generate a first main RF signal. The first input unit 230 may include an amplifier (not illustrated), a filter (not illustrated), etc., and may execute an amplifying process and/or a filtering process in addition to the A/D converting process so as to generate the first main RF signal.

The second input unit 240 includes an A/D converter 241, for example, and executes an A/D converting process and the like on a second main signal received through the second main terminal 212 so as to generate a second main RF signal. The second input unit 240 may include an amplifier (not illustrated), a filter (not illustrated), etc., and may execute an amplifying process and/or a filtering process in addition to the A/D converting process so as to generate the second main RF signal.

The demultiplexer 250 demultiplexes a sub-signal and a noise signal from a multiple signal received through the sub-terminal 220. The demultiplexer 250 includes bandpass filters 251, 253 and A/D converters 252, 254.

The bandpass filter 251 is a filter that causes a signal in the first frequency band of a multiple signal received through the sub-terminal 220 to pass therethrough. On the multiple signal, a sub-signal in the second frequency band and a noise signal in the first frequency band are multiplied. Therefore, the bandpass filter 251 causes a signal in the first frequency band of the multiple signal to pass therethrough so as to operate as an extraction unit that extracts a noise signal in the first frequency band from the multiple signal. The bandpass filter 251 outputs the extracted noise signal (hereinafter, may be referred to as "extraction noise signal") to the A/D converter 252.

The A/D converter 252 executes an A/D converting process on an extraction noise signal to generate an RF noise signal. The A/D converter 252 outputs the generated RF noise signal to the first demodulation unit 260. The demultiplexer 250 may include, for example, an amplifier (not illustrated), a filter (not illustrated), etc., and may execute an amplifying process and/or a filtering process in addition to the A/D converting process so as to generate the RF noise signal.

The bandpass filter 253 is a filter that causes a signal in the second frequency band of a multiple signal received through the sub-terminal 220 to pass therethrough. The bandpass filter 253 causes a signal in the second frequency band of a multiple signal to pass therethrough, so as to operate as an extraction unit that extracts a sub-signal in the second frequency band from the multiple signal. The bandpass filter 253 outputs the extracted sub-signal to the A/D converter 254.

The A/D converter 254 executes an A/D converting process on a sub-signal to generate a sub-RF signal. The A/D converter 254 outputs the generated sub-RF signal to the second demodulation unit 270. The demultiplexer 250 may include, for example, an amplifier (not illustrated), a filter (not illustrated), etc., and may execute an amplifying process and/or a filtering process in addition to the A/D converting process so as to generate the sub-RF signal.

The first demodulation unit 260 generates a first reception signal on the basis of the first main signal and the noise signal, and demodulates the generated first reception signal to generate a first demodulation signal. The first demodulation signal is a sound signal, for example, and is output from a speaker (not illustrated). The first demodulation unit 260 includes a noise reducing unit 280 and a wave detector 290.

The noise reducing unit 280 removes a noise signal demultiplexed by the demultiplexer 250 from the first main signal received through the main terminal 210 to reduce a noise included in the first main signal. Specifically, the noise reducing unit 280 multiplies an RF noise signal generated by the A/D converter 252 by, for example, a coefficient W so as to generate an operation signal, and subtracts this operation signal from a first main RF signal generated by the first input unit 230 so as to generate a first reception signal. The noise reducing unit 280 includes an operation unit 281, a subtraction unit 282, and a setting unit 283.

The operation unit 281 performs an operation according to the coefficient W on the basis of an RF noise signal input from the A/D converter 252, so as to generate an operation signal. For example, the operation unit 281 performs an operation that amplifies or attenuates amplitude of an RF noise signal in accordance with the coefficient W, so as to generate an operation signal having amplitude according to the coefficient W. The operation unit 281 performs an operation that shifts a phase of an RF noise signal in accordance with the coefficient W, so as to generate an operation signal having a phase according to the coefficient W. Specifically, the operation unit 281 multiplies an RF noise signal by the coefficient W, for example, so as to generate an operation signal having amplitude or a phase according to the coefficient W.

In this manner, the operation unit 281 converts at least one of amplitude and a phase of an RF noise signal in accordance with the coefficient W so as to operate as a converter that generates an operation signal. The coefficient W is set or updated by the setting unit 283 such that amplitude and a phase of an operation signal are close to those of a noise signal included in a first main RF signal.

The subtraction unit 282 subtracts an operation signal from a first main RF signal generated by the first input unit 230 so as to generate a first reception signal. When a process is executed in the operation unit 281 such that a phase of the operation signal becomes reverse to that of a noise signal included in a first main RF signal, the operation signal may be subtracted from the first main RF signal generated by the first input unit 230 by using an adder instead of the subtraction unit 282. The subtraction unit 282 outputs the generated first reception signal to the setting unit 283 and the wave detector 290.

The setting unit 283 sets the coefficient W of the operation unit 281 such that amplitude and a phase of the operation signal are similar to those of a noise signal included in a first main RF signal. When the main antenna unit 110 does not receive a broadcast wave (for example, AM-broadcast wave) in the first frequency band, for example, the setting unit 283 updates the coefficient W such that amplitude of the first reception signal approaches "0." Specifically, when a signal intensity of a first main signal is less than a predetermined value, the setting unit 283 updates the coefficient W such that amplitude of a first reception signal is smaller.

On the other hand, when the main antenna unit 110 receives an AM-broadcast wave, for example, the setting unit 283 sets the coefficient W of the operation unit 281 such that a value of the last-updated coefficient W is maintained. Specifically, when a signal intensity of a first main signal is equal to or more than a predetermined value, the setting unit 283 does not update the coefficient W.

When the main antenna unit 110 does not receive any AM-broadcast wave, it is considered that a first main signal includes many noise signals radiated from the noise source N. Thus, when the main antenna unit 110 does not receive any AM-broadcast wave, in other words, when a signal intensity of a first main signal is less than a predetermined value, the coefficient W is updated, so that the coefficient W, which can more reliably reduce the noise signal in the first main signal, can be set in the operation unit 281.

The setting unit 283 updates the coefficient W so that at least one of amplitude and a phase of an RF noise signal is converted. This is because the antenna 131 for receiving a noise signal is arranged at a position that is closer to the noise source N than a position at which the first main antenna 111 for receiving a first main signal is arranged.

The antenna 131 is arranged in the vicinity of the noise source N, and thus the antenna 131 receives a noise signal whose signal intensity is larger than that of the first main antenna 111. Therefore, when the coefficient W is updated such that a signal intensity of a noise signal received by the antenna 131 is similar to that received by the first main antenna 111, whereby a noise signal included in a first main signal (first main RF signal) can be reduced with higher accuracy.

The antenna 131 is arranged at a position that is far from the first main antenna 111 by a predetermined distance. Therefore, a phase of a noise signal received by the first main antenna 111 shifts from that received by the antenna 131 in accordance with, for example, this predetermined distance. Therefore, when the setting unit 283 updates the coefficient W such that a phase of a noise signal received by the antenna 131 is similar to that received by the first main antenna 111, whereby a noise signal included in a first main signal (first main RF signal) can be reduced with higher accuracy. The coefficient W may be updated such that a phase of the first main RF signal becomes reverse to that of the RF noise signal.

In this manner, the setting unit 283 sets the coefficient W on the basis of a first reception signal, so that it is possible to reduce a noise included in a first main signal with higher accuracy.

The wave detector 290 performs wave detection on, for example, envelopes of a first reception signal, and demodulates an amplitude-modulated first reception signal so as to generate a first demodulation signal. The first demodulation signal is converted into a first sound signal by an amplifying process, a filtering process, etc. executed in, for example, the latter processor (not illustrated), so as to be output from a speaker (not illustrated).

When a second main RF signal is input from the second input unit 240 and a sub-RF signal is input from the demultiplexer 250, the second demodulation unit 270 performs a synthesizing process etc. on these second main RF signal and sub-RF signal so as to generate a second reception signal. The second demodulation unit 270 performs a demodulating process etc. on the generated second reception signal so as to generate a second demodulation signal. The second demodulation signal is converted into a second sound signal by an amplifying process, a filtering process, etc. executed in, for example, the latter processor (not illustrated), so as to be output from a speaker (not illustrated).

1.3. Receiving Process

Next, a procedure for receiving processes to be executed by the wireless apparatus 1 according to the present embodiment will be explained with reference to FIG. 3. FIG. 3 is a flowchart illustrating a procedure for processes to be executed by the wireless apparatus 1 according to the present embodiment. This receiving process is assumed to be repeatedly executed when a power source of the wireless apparatus 1 is in an ON state, for example.

The antenna device 10 of the wireless apparatus 1 receives first and second main signals through the main antenna unit 110 and receives a sub-signal through the sub-antenna unit 120, and further receives a noise signal through the antenna unit 130 (Step S101).

The antenna device 10 transmits the first and second main signals through the main-signal cables 140 and transmits a multiple signal, obtained by multiplex the noise signal and the sub-signal, through the sub-signal cable 150 (Step S102).

The receiver 20 of the wireless apparatus 1 demultiplexes the sub-signal and the noise signal from the multiple signal (Step S103). The receiver 20 determines whether or not a reception intensity of the first main signal is less than a predetermined threshold Th (Step S104). When the reception intensity of the first main signal is equal to or more than the predetermined threshold Th (Step S104: No), the receiver 20 advances to Step S106.

On the other hand, when the reception intensity of the first main signal is less than the predetermined threshold Th (Step S104: Yes), the receiver 20 updates the coefficient W of the operation unit 281 (Step S105). The receiver 20 removes, from the first main signal, a noise signal at least one of whose amplitude and phase is converted by using the coefficient W updated in Step S105 so as to reduce a noise of the first main signal (Step S106).

The receiver 20 demodulates the first reception signal and demodulates the second reception signal generated on the basis of the second main signal and the sub-signal (Step S107).

As described above, by employing the wireless apparatus 1 according to the present embodiment, the antenna unit 130 receives a noise signal included in a first main signal, whereby a noise component included in a first reception signal can be reduced with higher accuracy, so that it is possible to improve reduction accuracy of a noise. A sub-signal received by the sub-antenna unit 120 and a noise signal received by the antenna unit 130 are multiplied and further transmitted, whereby it is possible to improve reduction accuracy of a noise without additionally providing a cable of the antenna device 10 or a terminal of the receiver 20, in other words, while suppressing enlargement of the wireless apparatus 1.

1.4. Modification

In the above embodiment, an FM broadcast is exemplified as the second frequency band, not limited thereto. It is sufficient that the second frequency band has a frequency band that is different from the first frequency band (for example, AM broadcast), and thus the second frequency band may be a frequency band in which, for example, Digital Audio Broadcast (DAB), Digital Television broadcast (DTV broadcast), or the like is performed. In this case, a multiple signal obtained by multiplex a noise signal and this broadcast wave can be transmitted by using a cable for transmitting a broadcast wave of DAB or DTV broadcast.

In the above embodiment, the case has been explained in which a sub-signal and a noise signal whose frequency bands are different form each other are multiplied in a frequency region, not limited thereto. For example, the sub-signal and the noise signal may be multiplied in a time region. Specifically, the sub-signal and the noise signal may be alternately transmitted through the sub-signal cable 150, for example. In this manner, a multiple signal obtained by time-division-multiplexing the sub-signal and the noise signal may be transmitted.

In the above embodiment, the case has been explained in which the receiver 20 executes the A/D converting processes, not limited thereto. For example, the antenna device 10 may execute A/D converting processes on the sub-signal and the noise signal and further may multiply the sub-signal and the noise signal that are converted into digital signals so as to transmit the converted sub-signal and the converted noise signal.

In the above embodiment, the case has been explained in which the antenna 131 of the antenna unit 130 is arranged in the vicinity of the noise source N so as to receive a noise signal, however, when the sub-antenna unit 120 is arranged at a position where a noise signal radiated from the noise source N can be received in addition to a second sub-signal, the sub-antenna unit 120 may be configured to receive the second sub-signal including the noise signal. In this case, the antenna 131 that is a noise picking-up antenna and the sub-amplifier 122 (or wave synthesizing unit) for multiplying a sub-signal and a noise signal become needless, and thus enlargement of the wireless apparatus 1 can be more preferably suppressed.

2. Second Embodiment

In the above first embodiment, the case has been explained in which the antenna 131 of the antenna unit 130 is arranged in the vicinity of the noise source N so as to receive a noise signal, not limited thereto. The antenna 131 is arranged at a position where a first sub-signal can be received in addition to the noise signal so as to receive the noise signal and the first sub-signal. Hereinafter, this case will be explained as a second embodiment.

2.1. Reception Method

Figure 4A:
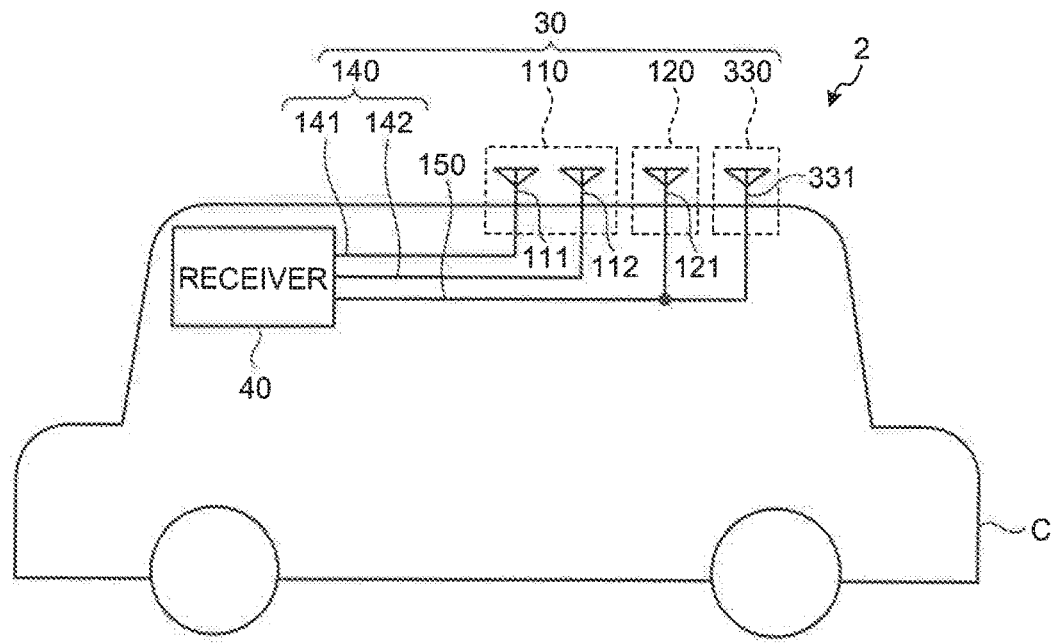
FIGS. 4A and 4B are diagrams illustrating a reception method according to a second embodiment.
Figure 4B:
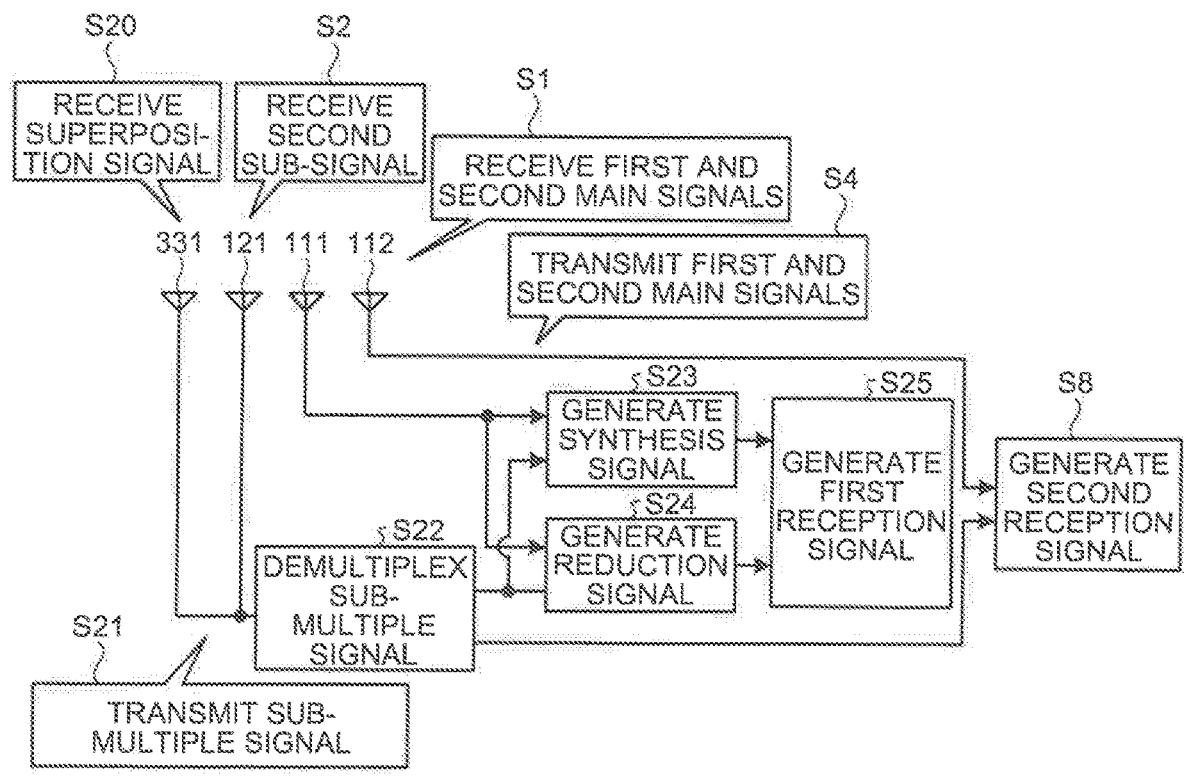

A reception method according to the second embodiment will be explained with reference to FIGS. 4A and 4B. FIGS. 4A and 4B are diagrams illustrating a reception method according to the present embodiment. The reception method according to the present embodiment is performed by a wireless apparatus 2 provided in the vehicle C such as an automobile, more preferably, an electric automobile, and a hybrid automobile.

The wireless apparatus 2 according to the second embodiment includes an antenna device 30 and a receiver 40. Note that in the following, a part of the reception method to be executed by the wireless apparatus 2 which is different from the first embodiment will be mainly described, and the common parts are represented with the same reference symbols and the description is omitted appropriately.

FIG. 4A is a diagram illustrating the wireless apparatus 2 according to the present embodiment. As illustrated in FIG. 4A, an antenna unit 330 of the wireless apparatus 2 includes an antenna 331 that is arranged at a position, such as a vehicle body of the vehicle C, where a first sub-signal including a broadcast wave in the first frequency band can be easily received.

The noise source N of the noise signal is not limited to an electronic circuit etc. provided in the vehicle C, such as an inverter and a motor, and may be an electronic device etc. outside of the vehicle C. The sub-signal cable 150 connects the sub-antenna unit 120 and the antenna unit 330 with the receiver 20.

FIG. 4B is a diagram explaining the reception method according to the present embodiment. Note that the same processes as those illustrated in FIG. 1B are represented with the same reference symbols and the description is omitted appropriately.

In the reception method according to the present embodiment, a multiple signal obtained by multiplex a noise signal and a first sub-signal is received through the antenna unit 330 of the antenna device 30 (Step S20). The antenna device 30 transmits, to the receiver 40 through the sub-signal cable 150, a sub-multiple signal obtained by multiplex the multiple signal received by the antenna unit 330 and a second sub-signal received by the sub-antenna unit 120 each other (Step S21).

In the reception method according to the present embodiment, the receiver 40 demultiplexes the multiple signal and the second sub-signal from the sub-multiple signal received through the sub-terminal 220 connected with the sub-signal cable 150 (Step S22). The receiver 40 generates a synthesis signal obtained by synthesizing a first main signal and a first sub-signal included in the multiple signal (Step S23), and further generates a reduction signal obtained by reducing the first main signal by the noise signal included in the multiple signal (Step S24).

The receiver 40 generates a first reception signal on the basis of the generated synthesis signal and the generated reduction signal (Step S25). For example, the receiver 40 uses one of the synthesis signal and the reduction signal as a first reception signal on the basis of a signal-to-noise ratio. For example, when the noise signal included in the first main signal is small, the receiver 40 uses the synthesis signal as the first reception signal, when the noise signal included in the first main signal is large, the receiver 40 uses the reduction signal as the first reception signal.

In this manner, in the reception method according to the present embodiment, even when the antenna unit 330 receives a first sub-signal including a noise signal and a broadcast wave in the first frequency band, a noise included in the first main signal can be reduced with higher accuracy without enlarging the wireless apparatus 2. Hereinafter, details of a configuration of the wireless apparatus 2 will be explained.

2.2. Wireless Apparatus

Figure 5:
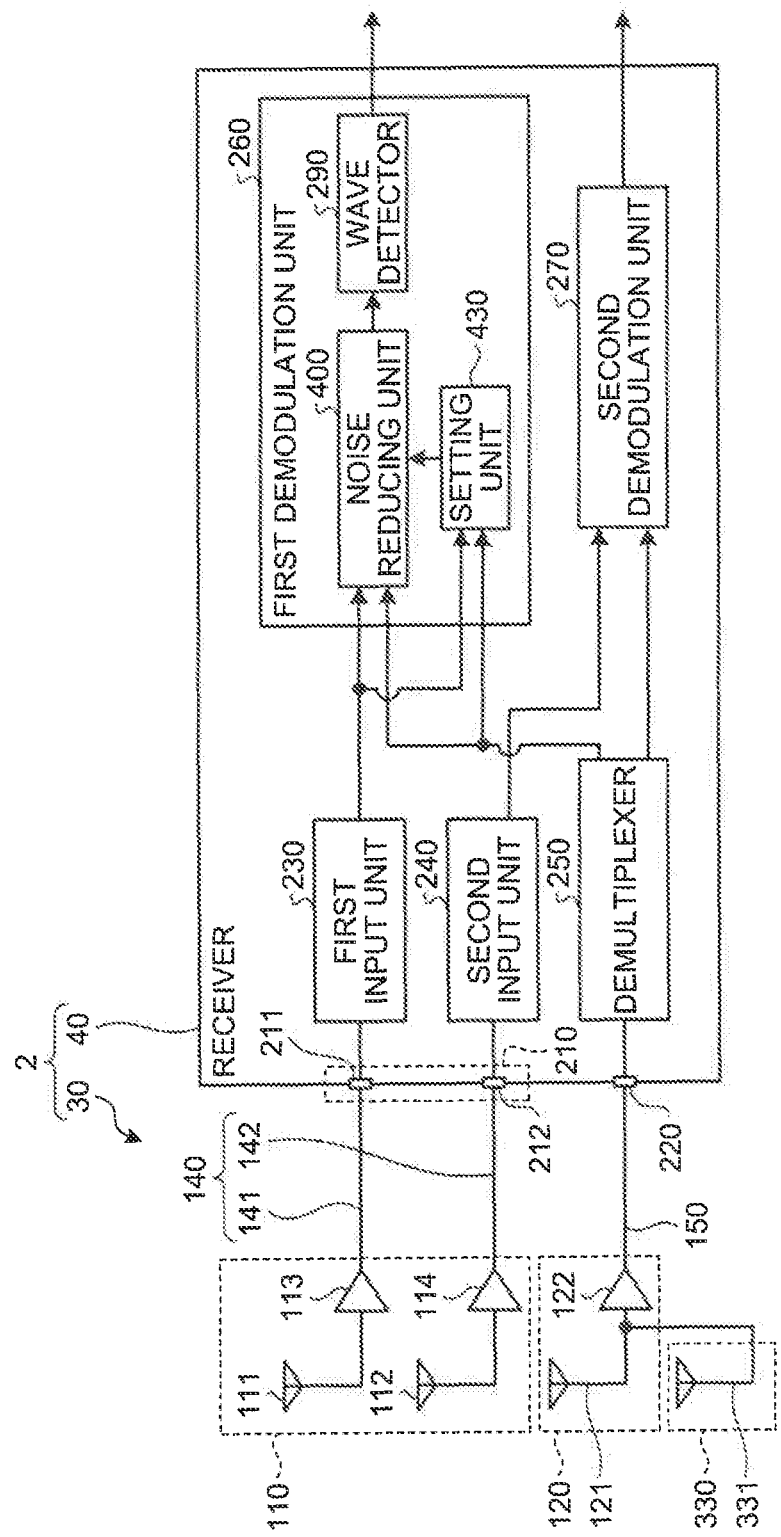
FIG. 5 is a diagram illustrating a configuration of a wireless apparatus according to the second embodiment.

FIG. 5 is a diagram illustrating a configuration of the wireless apparatus 2 according to the present embodiment. As illustrated in FIG. 5, the wireless apparatus 2 includes the antenna device 30 and the receiver 40.

2.2.1. Antenna Device

The antenna device 30 differs from the antenna device 10 illustrated in FIG. 2 in that the antenna device 30 includes the antenna 331 instead of the antenna 131. The antenna 331 receives a noise signal included in a first main signal and a first sub-signal including a broadcast wave (AM-broadcast wave) in the first frequency band. Thus, the sub-amplifier 122 connected with the antenna 331 amplifies a signal obtained by multiplex a multiple signal, which is obtained by multiplex the noise signal and the first sub-signal, and the second sub-signal on each other so as to generate a sub-multiple signal.

Similarly to the first and second main antennas 111, 112 and the sub-antenna 121, the antenna 331 is arranged at a position, such as an outside of a vehicle body of the vehicle C, where a broadcast wave in the first frequency band can be easily received. It is preferable that the antenna 331 is arranged such that the antenna 331 is physically demultiplexed from the first main antenna 111.

Here the case is explained in which the antenna 331 is provided in addition to the sub-antenna 121, not limited thereto. For example, first and second sub-signals may be received by using a broadband antenna. Thus, the number of antennas can be reduced.

2.2.2. Receiver

The receiver 40 differs from the receiver 20 illustrated in FIG. 2 in that the receiver 40 includes a noise reducing unit 400 and a setting unit 430 instead of the noise reducing unit 280. The sub-multiple signal is a signal obtained by multiplex a multiple signal and a second sub-signal each other, and thus the demultiplexer 250 demultiplexes the multiple signal and the second sub-signal from the sub-multiple signal. The demultiplexer 250 performs an A/D converting process etc. on the demultiplexed multiple signal so as to generate a multiplied RF signal.

Figure 6:
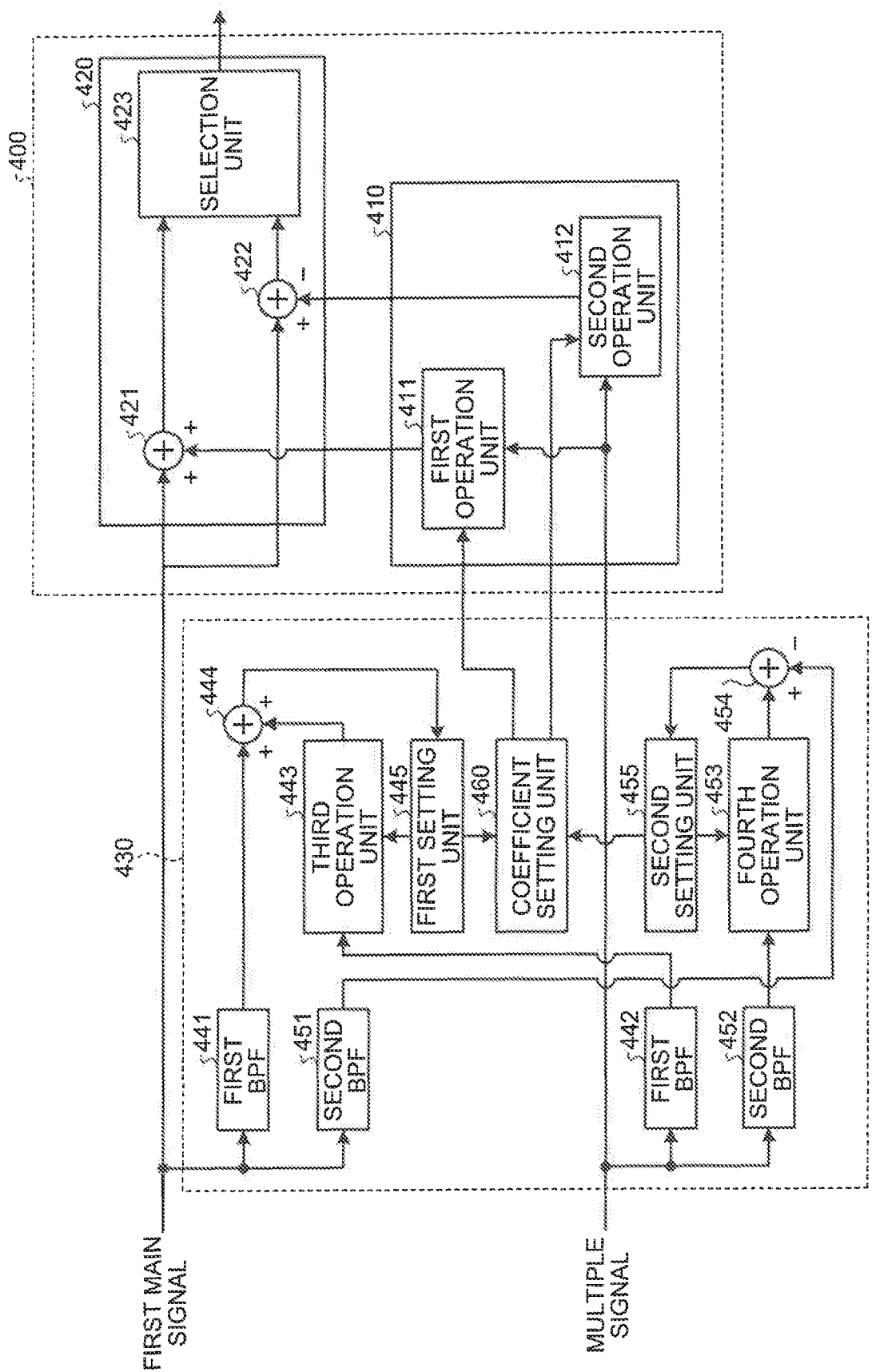
FIG. 6 is a diagram illustrating configurations of a noise reducing unit and a setting unit according to the second embodiment.

The noise reducing unit 400 and the setting unit 430 will be explained with reference to FIG. 6. FIG. 6 is a diagram illustrating configurations of the noise reducing unit 400 and the setting unit 430 according to the present embodiment. To the noise reducing unit 400, a first main signal (to be more specific, first main RF signal), which is transmitted through the main-signal cables 140, and a multiple signal (to be more specific, multiplied RF signal) demultiplexed by the demultiplexer 250 are input. The noise reducing unit 400 generates a first reception signal (reception signal) on the basis of a synthesis signal obtained by synthesizing the first main RF signal and the multiplied RF signal and a reduction signal obtained by reducing the first main RF signal by the multiplied RF signal.

The noise reducing unit 400 includes an operation unit 410 and a generation unit 420. The operation unit 410 generates an operation signal according to a coefficient on the basis of the multiple signal demultiplexed by the demultiplexer 250. The operation unit 410 includes a first operation unit 411 and a second operation unit 412.

The first operation unit 411 generates a first operation signal according to a first coefficient W1 on the basis of a multiplied RF signal demultiplexed by the demultiplexer 250. For example, the first operation unit 411 multiplies a multiplied RF signal by the first coefficient W1 so as to generate a first operation signal having amplitude or a phase according to the first coefficient W1. The first operation unit 411 outputs the generated first operation signal to the generation unit 420.

The second operation unit 412 generates a second operation signal according to a second coefficient W2 on the basis of a multiplied RF signal demultiplexed by the demultiplexer 250. For example, the second operation unit 412 multiplies a multiplied RF signal by the second coefficient W2 so as to generate a second operation signal having amplitude or a phase according to the second coefficient W2. The second operation unit 412 outputs the generated second operation signal to the generation unit 420. The first and second operation signals may be collectively referred to as "operation signal."

The generation unit 420 generates a first reception signal on the basis of an operation signal generated by the operation unit 410 and a first main RF signal. The generation unit 420 includes a synthesis unit 421, a reduction unit 422, and a selection unit 423.

The synthesis unit 421 synthesizes a first main RF signal generated by the first input unit 230 and a first operation signal generated by the first operation unit 411 so as to generate a synthesis signal. For example, the synthesis unit 421 includes an adder, and adds the first main RF signal to the first operation signal so as to generate the synthesis signal. Thus, the synthesis unit 421 generates a signal obtained by synthesizing a first main signal and a first sub-signal. The synthesis unit 421 outputs the generated synthesis signal to the selection unit 423.

The reduction unit 422 reduces a first main RF signal generated by the first input unit 230 by a second operation signal generated by the second operation unit 412 so as to generate a reduction signal. For example, the reduction unit 422 includes a subtractor, and subtracts a second operation signal from a first main RF signal so as to generate a reduction signal. Thus, the reduction unit 422 generates a signal obtained by reducing a first main signal by a noise component.

When an operation is performed in the second operation unit 412 such that a phase of a second operation signal becomes reverse to that of a first main RF signal, the second operation signal may be added to the first main RF signal generated by the first input unit 230 by using the reduction unit 422 as an adder instead of a subtractor. The reduction unit 422 outputs the generated reduction signal to the selection unit 423.

The selection unit 423 selects one of a synthesis signal generated by the synthesis unit 421 and a reduction signal generated by the reduction unit 422 as a first reception signal. For example, the receiver 40 uses one of the synthesis signal and the reduction signal as the first reception signal on the basis of a signal-to-noise ratio. The selection unit 423 outputs the first reception signal to the wave detector 290. Thus, the selection unit 423 can select, as a first reception signal, a signal whose noise is more reduced out of the synthesis signal and the reduction signal.

The setting unit 430 sets a coefficient to be used in an operation performed by the operation unit 410 on the basis of a first main signal and a multiple signal. The setting unit 430 demultiplexes a first sub-signal and a noise signal from the multiple signal, and sets a coefficient to be used in an operation performed by the operation unit 410 on the basis of the demultiplexed first sub-signal and the demultiplexed noise signal. In other words, the setting unit 430 includes a demultiplexer that demultiplexes a first sub-signal and a noise signal from a multiple signal.

The setting unit 430 includes first bandpass filters 441, 442, a third operation unit 443, a first synthesis unit 444, and a first setting unit 445. The setting unit 430 includes second bandpass filters 451, 452, a fourth operation unit 453, a first reduction unit 454, and a second setting unit 455. The setting unit 430 includes a coefficient setting unit 460.

The first bandpass filter 441 is a first extraction unit that extracts, from a first main signal, a main component of a broadcast wave which includes a broadcast wave in the first frequency band. The first bandpass filter 441 uses a band including a broadcast wave in, for example, the first frequency band from the first main RF signal as a first pass band Wf1, and extracts the main component of the broadcast wave that passes this first pass band Wf1.

The first bandpass filter 442 is a second extraction unit that extracts, from a multiple signal, a sub-component of a broadcast wave which includes a broadcast wave in the first frequency band. The first bandpass filter 442 uses, for example, the first pass band Wf1 as a pass band, and extracts the sub-component of the broadcast wave from the multiplied RF signal. Each of the main component and the sub-component of the broadcast wave is a signal component in which a signal intensity of a broadcast wave is larger than that of a noise signal, in other words, the signal component mainly includes a first sub-signal. The first pass band Wf1 will be mentioned later with reference to FIG. 7.

The third operation unit 443 generates a third operation signal according to the first coefficient W1 on the basis of a sub-component of a broadcast wave extracted by the first bandpass filter 442. The third operation unit 443 multiplies the sub-component of the broadcast wave by, for example, the first coefficient W1 so as to generate a third operation signal having amplitude or a phase according to the first coefficient W1.

The first synthesis unit 444 synthesizes a main component of a broadcast wave extracted by the first bandpass filter 441 and a third operation signal generated by the third operation unit 443 so as to generate a first synthesis signal. For example, the first synthesis unit 444 includes an adder, and adds a main component of a broadcast wave to a third operation signal so as to generate a first synthesis signal.

The first setting unit 445 sets the first coefficient W1 of the third operation unit 443 on the basis of a first synthesis signal synthesized by the first synthesis unit 444. The first setting unit 445 sets the first coefficient W1 such that amplitude of the first synthesis signal becomes maximum, for example.

Specifically, the first setting unit 445 adds a difference dW1 to the first coefficient W1 of the third operation unit 443, for example, so as to update the first coefficient W1. The difference dW1 is assumed to be a positive or a negative number.

The first setting unit 445 compares amplitude of a first synthesis signal before and after the update of the first coefficient W1 with each other, and sets the first coefficient W1 so that this amplitude is increased. In this manner, the first setting unit 445 sets the first coefficient W1 so that a first synthesis signal based on a main component and a sub-component of a broadcast wave, in other words, a gain of a broadcast wave in the first frequency band becomes large. The first setting unit 445 outputs the set first coefficient W1 to the coefficient setting unit 460. Alternatively, the first setting unit 445 may output the difference dW1.

The second bandpass filter 451 is a third extraction unit that extracts a main component of a noise from a first main signal. The second bandpass filter 451 uses a band including a noise signal in, for example, the first frequency band from a first main RF signal as a second pass band Wf2. The second pass band Wf2 is a band that is different from the first pass band Wf1. The second bandpass filter 451 uses the second pass band Wf2 as a pass band so as to extract a main component of a noise from the first main RF signal.

The second bandpass filter 452 is a fourth extraction unit that extracts a sub-component of a noise from a multiple signal. The second bandpass filter 452 uses, for example, the band Wf2 as a pass band so as to extract a sub-component of a noise from a first sub-RF signal. Each of the main component of the noise and the sub-component of the noise is a signal component in which a signal intensity of a broadcast wave is larger than that of a noise signal, in other words, the signal component mainly includes a noise signal. The second pass band Wf2 will be mentioned later with reference to FIG. 7.

The fourth operation unit 453 generates a fourth operation signal according to the second coefficient W2 on the basis of a sub-component of a noise extracted by the second bandpass filter 452. The fourth operation unit 453 multiplies a sub-component of a noise by, for example, the second coefficient W2 so as to generate a fourth operation signal having amplitude or a phase according to the second coefficient W2.

The first reduction unit 454 reduces a fourth operation signal generated by the fourth operation unit 453 by a main component of a noise extracted by the second bandpass filter 451 so as to generate a first reduction signal. For example, the first reduction unit 454 includes a subtractor, and subtracts a fourth operation signal from a main component of a noise so as to generate a first reduction signal. When an operation is performed in the fourth operation unit 453 such that a phase of a fourth operation signal becomes reverse to that of a main component of a noise, the fourth operation signal may be added to the main component of the noise by using the first reduction unit 454 as an adder instead of a subtractor.

The second setting unit 455 sets the second coefficient W2 of the fourth operation unit 453 on the basis of a first reduction signal generated by the first reduction unit 454. The second setting unit 455 sets the second coefficient W2 such that, for example, amplitude of a first reduction signal approaches "0." Specifically, the second setting unit 455 adds a difference dW2 to the second coefficient W2 of the fourth operation unit 453, for example, so as to update the second coefficient W2. The difference dW2 is assumed to be a positive or a negative number.

The second setting unit 455 compares amplitude of a first reduction signal before and after the update of the second coefficient W2 with each other, and sets the second coefficient W2 such that this amplitude is decreased. In this manner, the second setting unit 455 sets the second coefficient W2 such that a first reduction signal based on a main component and a sub-component of a noise, in other words, a gain of a noise signal in the first frequency band becomes small. The second setting unit 455 outputs the set second coefficient W2 to the coefficient setting unit 460. Alternatively, the second setting unit 455 may output the difference dW2.

The coefficient setting unit 460 sets a coefficient of the operation unit 410 on the basis of the first and second coefficients W1, W2 updated by the first and second setting units 445, 455. Specifically, the coefficient setting unit 460 sets the first and second coefficients W1, W2 of the first and second operation units 411, 412 to be values updated by the first and second setting units 445, 455. For example, when the first and second setting units 445, 455 output the difference dW1, dW2 of the first and second coefficients W1, W2, the coefficient setting unit 460 adds these differences dW1, dW2 to the first and second coefficients W1, W2 of the first and second operation units 411, 412, respectively.

Figure 7:
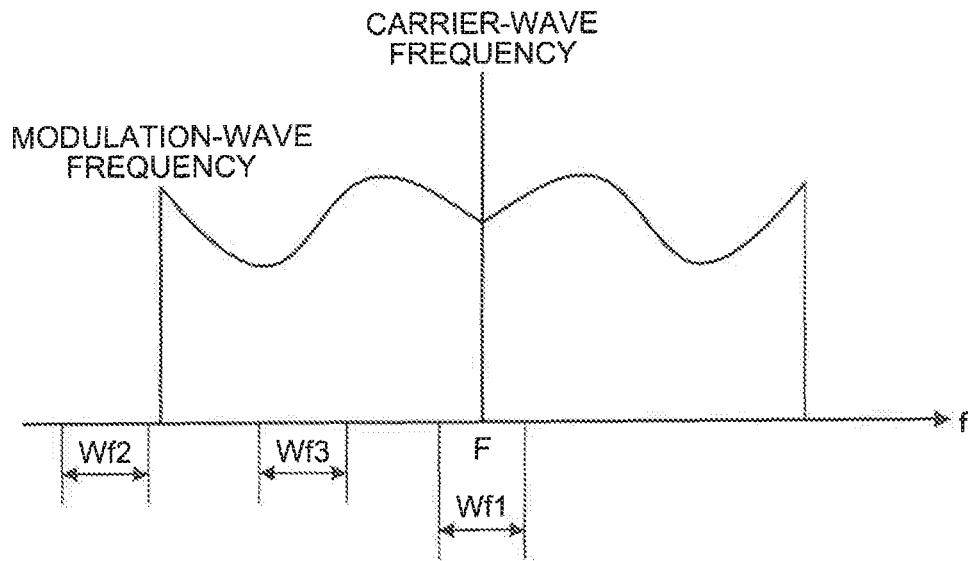
FIG. 7 is a diagram illustrating pass bands of first and second bandpass filters according to the second embodiment.

The first and second pass bands Wf1, Wf2 will be explained with reference to FIG. 7. FIG. 7 is a diagram illustrating pass bands of the first and second bandpass filters 441, 442, 451, 452. In FIG. 7, a frequency distribution of a predetermined channel included in a broadcast wave in the first frequency band is indicated.

For example, in a radio broadcast such as an AM broadcasting, signals of a plurality of channels are sent in a predetermined frequency band. These signals include carrier waves for carrying the signals and modulation waves obtained by multiplex sound data and the signals. Hereinafter, a carrier wave and a modulation wave of each of the channels may be referred to as a channel signal.

In FIG. 7, a frequency F (hereinafter, may be referred to as "carrier-wave frequency") of a carrier wave of a predetermined channel signal and a frequency (hereinafter, may be referred to as "modulation-wave frequency") of a modulation wave of this channel signal are illustrated. As illustrated in FIG. 7, the modulation-wave frequency has a predetermined frequency-band width and a frequency distribution whose upper-side band and lower-side band are symmetrical to each other while placing a carrier-wave frequency F at a center of the bands.

The first pass band Wf1 of the first bandpass filters 441, 442 is a band that includes the carrier-wave frequency F. As illustrated in FIG. 7, the first pass band Wf1 is a narrow band including the carrier-wave frequency F. Therefore, it can be said that a main component and a sub-component of the broadcast wave having passed the first bandpass filters 441, 442 mainly are signal components of the carrier-wave frequency F.

In this manner, the band width of the first pass band Wf1 is narrow and further includes the carrier-wave frequency F, and thus a noise signal is hardly included in the main component and the sub-component of the broadcast wave. In the present embodiment, as described above, the first synthesis unit 444 generates a first synthesis signal according to the first coefficient W1 on the basis of a main component and a sub-component of a broadcast wave, and the first setting unit 445 updates the first coefficient W1 such that the first synthesis signal becomes large. Thus, the first setting unit 445 can set the first coefficient W1 that causes a gain of the broadcast wave included in the first main RF signal to increase.

As illustrated in FIG. 7, the second pass band Wf2 of the second bandpass filters 451, 452 is a band out of a modulation-wave frequency. Specifically, the second pass band Wf2 is a band between a plurality of channel signals included in the broadcast wave. Therefore, a main component and a sub-component of a noise having passed the second bandpass filters 451, 452 mainly include the noise signal.

In the present embodiment, as described above, the first reduction unit 454 generates a first reduction signal according to the second coefficient W2 on the basis of the main component and the sub-component of the noise, and the second setting unit 455 updates the second coefficient W2 such that a first reduction signal becomes small. Thus, the second setting unit 455 can set the second coefficient W2 that causes a gain of the noise signal included in the first main RF signal to reduce.

For example, in a case where a first main RF signal and a multiplied RF signal include a noise signal that is larger than a broadcast wave, when the coefficient setting unit 460 sets the first coefficient W1 of the first operation unit 411 such that the broadcast wave included in the first main RF signal and the first sub-RF signal becomes large, the noise signal included in the synthesis signal is in some cases larger than the broadcast wave.

For example, in a case where a first main RF signal and a multiplied RF signal include a broadcast wave that is larger than a noise signal, when the coefficient setting unit 460 sets the second coefficient W2 of the second operation unit 412 such that the noise signal included in the first main RF signal becomes small, the broadcast wave included in the reduction signal is in some cases smaller.

Therefore, the selection unit 423 selects in accordance with a signal-to-noise ratio, as a first reception signal, one of a synthesis signal according to the first coefficient W1 and a reduction signal according to the second coefficient W2. In other words, when a first main RF signal and a multiplied RF signal include a noise signal that is larger than a broadcast wave, the selection unit 423 uses a reduction signal as a first reception signal, for example. When the first main RF signal and the multiplied RF signal include the broadcast wave that is larger than the noise signal, the selection unit 423 uses a synthesis signal as the first reception signal, for example.

Thus, the selection unit 423 can select, as a first reception signal, one of a synthesis signal and a reduction signal, whose noise is smaller. Therefore, the noise reducing unit 400 can more reduce effects of a noise to be given to a first reception signal, and thus a noise can be reduced with high accuracy.

Here the second pass band Wf2 of the second bandpass filters 451, 452 is that between channels, not limited thereto. It is sufficient that the second pass band Wf2 is a band that hardly includes a channel signal, and the second pass band Wf2 may be a band (for example, "Wf3" illustrated in FIG. 7) not including the carrier-wave frequency F but including a modulation-wave frequency, for example.

In this case, the second setting unit 455 updates the second coefficient W2 when a main component and a sub-component of a noise do not include a modulation wave. In other words, the second setting unit 455 updates the second coefficient W2 when a noise signal is mainly included in a main component of a noise and a sub-component of a noise. Whether or not a main component and a sub-component of a noise includes a modulation wave can be determined by comparing an upper-side band and a lower-side band of the modulation wave with each other. This is because the modulation-wave frequency has a frequency distribution whose upper-side band and lower-side band are symmetrical to each other while placing the carrier-wave frequency F at a center of the bands.

A band not including the carrier-wave frequency F but including a modulation-wave frequency may be a band Wf3 having a predetermined band width, and may be a band obtained by removing the carrier-wave frequency F from a band including the modulation-wave frequency and the carrier-wave frequency F by using, for example, a notch filter etc.

For example, with respect to a plurality of channels included in a broadcast wave, when parts of frequency bands of the channels are overlapped with each other, there exists in some cases a band between the channels not including a modulation wave. Even in this case, when a band of the modulation-wave frequency is used as a second pass band, the reduction unit 422 can generate a reduction signal obtained by reducing a noise signal included in a first main signal.

2.3. Receiving Process

Figure 8:
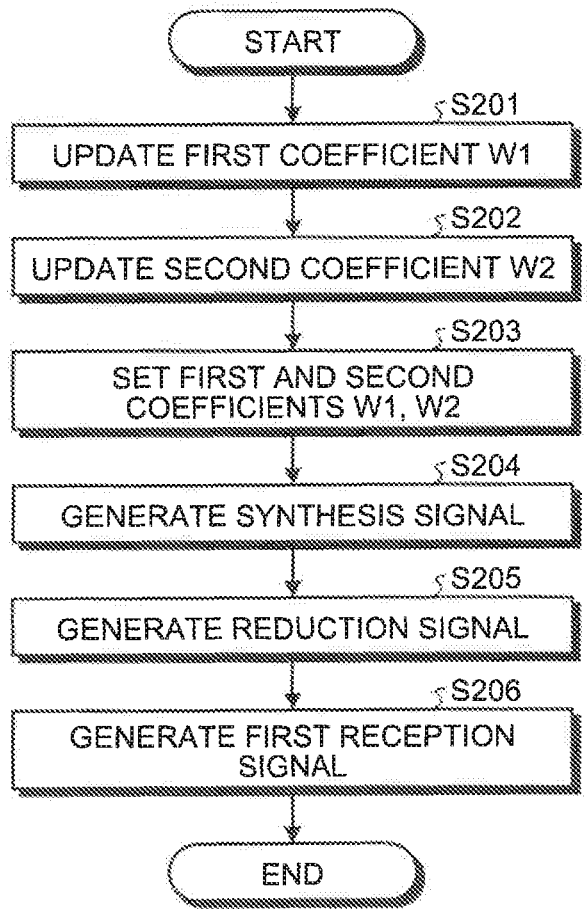
FIG. 8 is a flowchart illustrating a procedure for processes to be executed by the wireless apparatus according to the second embodiment.

Next, a procedure for receiving processes to be executed by the wireless apparatus 2 according to the present embodiment will be explained with reference to FIG. 8. FIG. 8 is a flowchart illustrating a procedure for processes to be executed by the wireless apparatus 2 according to the present embodiment. This receiving process is assumed to be repeatedly executed when a power source of the wireless apparatus 2 is in an ON state, for example. From a process for receiving first and second main signals and a sub-multiple signal from the antenna device 30 to a process for demultiplexing this sub-multiple signal is similar to the processes of Steps S101 to S103 of the receiving process illustrated in FIG. 3 except that the multiple signal is replaced by a sub-multiple signal, and thus explanation thereof will be omitted.

The receiver 40 of the wireless apparatus 2 updates the first coefficient W1 of the third operation unit 443 on the basis of a broadcast wave (first sub-signal) included in a first main signal and a multiple signal (Step S201). The receiver 40 updates the second coefficient W2 of the fourth operation unit 453 on the basis of a noise signal included in the first main signal and the multiple signal (Step S202).

The coefficient setting unit 460 of the receiver 40 sets the first and second coefficients W1, W2 of the first and second operation units 411, 412 on the basis of the first and second coefficients W1, W2 of the third and fourth operation units 443, 453, which are updated in Steps S201, S202 (Step S203).

The synthesis unit 421 of the receiver 40 synthesizes a first operation signal, which is computed by the first operation unit 411 in accordance with the first coefficient W1, and a first main RF signal so as to generate a synthesis signal (Step S204). The reduction unit 422 reduces the first main RF signal by a second operation signal computed by the second operation unit 412 in accordance with the second coefficient W2 so as to generate a reduction signal (Step S205).

The selection unit 423 selects one of the synthesis signal and the reduction signal in accordance with a signal-to-noise ratio, so as to generate a first reception signal (Step S206). For example, processes after the generation of the first reception signal, in which the selection unit 423 selects one of the synthesis signal and the reduction signal having a higher signal-to-noise ratio so as to generate the first reception signal, are similar to those of the receiving process illustrated in FIG. 3, and thus explanation thereof is omitted.

Processing orders of Steps S201, S202 may be exchanged, or Steps S201, S202 may be executed simultaneously. Processing orders of Steps S204, S205 may be exchanged, or Steps S204, S205 may be executed simultaneously.

As described above, even when the antenna unit 330 receives a noise signal and a first sub-signal including a broadcast wave in the first frequency band, the wireless apparatus 2 according to the present embodiment uses one of a synthesis signal obtained by synthesizing a first main signal and the first sub-signal, and a reduction signal obtained by reducing the first main signal by the noise signal as a first reception signal, to be able to reduce a noise included in the first reception signal with higher accuracy.

The setting unit 430 sets coefficients on the basis of a broadcast-wave component and a noise component of a first main signal and a multiple signal, and thus a noise signal included in a first reception signal can be more reliably reduced to be able to reduce a noise with higher accuracy.

The reception device (receiver) 20, 40 according to the first or second embodiment includes the main terminal 210, the sub-terminal 220, the demultiplexer 250, (setting unit) 430, and the noise reducing unit 280, 400. To the main terminal 210, a main signal is input. The main signal includes a broadcast wave. To the sub-terminal 220, a multiple signal is input. The multiple signal is obtained by multiplex a noise signal and a sub-signal including the broadcast wave. The demultiplexer 250 demultiplexes the noise signal and the sub-signal from the multiple signal input from the sub-terminal 220. The noise reducing unit 280, 400 reduces a noise component included in the main signal by using the noise signal demultiplexed by the demultiplexer 250.

Thus, reduction accuracy of a noise of the reception device (receiver) 20, 40 can be improved.

A first main signal and a second main signal are input to the main terminal 210 of the reception device (receiver) 20 according to the first embodiment. The first main signal includes a broadcast wave of the first frequency band. The second main signal includes a broadcast wave of a second frequency band. A multiple signal obtained by multiplex the noise signal and a second sub-signal is input to the sub-terminal 220. The second sub-signal includes the broadcast wave of the second frequency band. The demultiplexer 250 demultiplexes the noise signal and the second sub-signal from the multiple signal input from the sub-terminal 220. The noise reducing unit 280 reduces a noise component included in the first main signal by using the noise signal demultiplexed by the demultiplexer 250.

Thus, a noise component can be reduced, which is included in a first main signal including a broadcast wave of the first frequency band, and thus reduction accuracy of a noise of the reception device (receiver) 20 can be improved.

A first main signal is input to the main terminal 210 of the reception device (receiver) 40 according to the second embodiment. The first main signal includes a broadcast wave of the first frequency band. A multiple signal obtained by multiplex the noise signal and a first sub-signal is input to the sub-terminal 220. The first sub-signal includes the broadcast wave of the first frequency band. The demultiplexer (setting unit) 430 demultiplexes the noise signal and the first sub-signal from the multiple signal input from the sub-terminal 220. The noise reducing unit 400 reduces a noise component included in the first main signal by using the noise signal demultiplexed by the demultiplexer (setting unit) 430.

Thus, a noise component can be reduced, which is included in a first main signal including a broadcast wave of the first frequency band, and thus reduction accuracy of a noise of the reception device (receiver) 40 can be improved.

The noise reducing unit 400 of the reception device (receiver) 40 according to the second embodiment generates a reception signal in which a noise signal is reduced on the basis of (i) a synthesis signal obtained by synthesizing the first main signal and the first sub-signal and (ii) a reduction signal obtained by reducing the noise component included in the first main signal by using the noise signal.

Thus, even in a case where a first sub-signal, which includes a noise signal and a broadcast wave of the first frequency band, is input to the sub-terminal 220, when a first reception signal is generated on the basis of (i) a synthesis signal obtained by synthesizing a first main signal and the first sub-signal and (ii) a reduction signal obtained by reducing the first main signal by the noise signal included in the first sub-signal, a noise included in the first main signal can be reduced with higher accuracy.

The noise reducing unit of the reception device (receiver) 40 according to the second embodiment compares signal-to-noise ratios of the synthesis signal and the reduction signal with each other, and selects one of the synthesis signal and the reduction signal, which has a higher signal-to-noise ratio, so as to use the selected one as the reception signal.

Thus, a signal of a synthesis signal or a reduction signal, whose noise is more reduced, can be used as a reception signal, and thus a noise included in a first main signal can be reduced with higher accuracy.

The noise reducing unit 400 of the reception device (receiver) 40 according to the second embodiment includes the first operation unit 411, the second operation unit 412, and the generation unit 420. The first operation unit 411 generates a first operation signal according to the first coefficient W1 on the basis of the first sub-signal demultiplexed by the demultiplexer 250. The second operation unit 412 generates a second operation signal according to the second coefficient W2 on the basis of the first sub-signal demultiplexed by the demultiplexer 250. The generation unit 420 synthesizes the first operation signal and the first main signal to generate the synthesis signal, and reduces the first main signal by the second operation signal to generate the reduction signal. The demultiplexer (setting unit) 430 includes the first setting unit 445 and the second setting unit 455. The first setting unit 445 sets the first coefficient W1 on the basis of the first main signal and a component including the broadcast wave of the first sub-signal. The second setting unit 455 sets the second coefficient W2 on the basis of the first main signal and a component including the noise signal of first sub-signal.

Thus, even in a case where the antenna unit 330 receives a noise signal and a first sub-signal including a broadcast wave of the first frequency band, when one of (i) a synthesis signal obtained by synthesizing a first main signal and the first sub-signal and (ii) a reduction signal obtained by reducing the first main signal by the noise signal is used as a first reception signal, a noise included in the first main signal can be reduced with higher accuracy.

The reception method according to any one of the first and second embodiment includes (i) receiving a main signal, which includes a broadcast wave, through the main terminal 210, (ii) receiving a multiple signal, which is obtained by multiplex a noise signal and a sub-signal including the broadcast wave, through the sub-terminal 220, (iii) demultiplexing the noise signal and the sub-signal from the multiple signal that is input from the sub-terminal 220, and (iv) reducing a noise component included in the main signal by using the noise signal.

Thus, reduction accuracy of a noise can be improved.

The wireless apparatus 1, 2 according to the first or second embodiment includes the main antenna unit 110, the sub-antenna unit 120, the antenna unit 130, 330, the sub-signal cable 150, the demultiplexer 250, and the noise reducing unit 280, 400. The main antenna unit 110 receives a main signal including a broadcast wave. The sub-antenna unit 120 receives a sub-signal (second sub-signal) including the broadcast wave. The antenna unit 130, 330 receives a noise signal. The sub-signal cable 150 transmits a multiple signal obtained by multiplex the noise signal received by the antenna unit 130, 330 and the sub-signal received by the sub-antenna unit 120. The demultiplexer 250 demultiplexes the noise signal and the sub-signal from the multiple signal transmitted through the sub-signal cable 150. The noise reducing unit 280, 400 reduces a noise component included in the main signal by using the noise signal demultiplexed by the demultiplexer 250 from the first main signal.

Thus, reduction accuracy of a noise can be improved without additionally providing a cable of the antenna device 10, 30 and a terminal of the receiver 20, 40, in other words, while suppressing enlargement of the wireless apparatus 1, 2.

The wireless apparatus 1, 2 according to the first or second embodiment further includes a multiple unit (sub-amplifier) 122 that multiplies the noise signal received by the antenna unit 130, 330 on the sub-signal (second sub-signal) received by the sub-antenna unit 120 to generate the multiple signal.

Thus, the number of multiple units (amplifiers) can be reduced compared with a case where the sub-signal and the noise signal are individually multiplied, and thus reduction accuracy of a noise can be improved while suppressing enlargement of the wireless apparatus 1, 2.

The antenna unit 130 of the wireless apparatus 1 according to the first embodiment is arranged in a position that is closer to the noise source N radiating the noise signal than a position in which the main antenna unit 110 is arranged.

Thus, the antenna unit 130 is configured to mainly receive a noise signal, when a noise reducing process is executed by using the noise signal received by this antenna unit 130, reduction accuracy of a noise can be more improved.

According to the present disclosure, it is possible to provide a reception device, a reception method, and a wireless apparatus that are able to improve reduction accuracy of a noise.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A reception device comprising:
   a main terminal to which a main signal is input, the main signal including a broadcast wave;
   a sub-terminal to which a multiple signal is input, the multiple signal being obtained by multiplexing a noise signal and a sub-signal including the broadcast wave;
   a demultiplexer that demultiplexes the noise signal and the sub-signal from the multiple signal input from the sub-terminal; and a noise reducer that reduces a noise component included in the main signal by using the noise signal demultiplexed by the demultiplexer.

2. The reception device according to claim 1, wherein
the main signal includes a first main signal and a second main signal, the first main signal and the second main signal are input to the main terminal, the broadcast wave includes a first broadcast wave of a first frequency band and a second broadcast wave of a second frequency band, the first main signal includes the first broadcast wave, and the second main signal includes the second broadcast wave,
the multiple signal includes a second multiple signal obtained by multiplexing the noise signal and a second sub-signal, the second multiple signal is input to the sub-terminal, and the second sub-signal includes the second broadcast wave,
the demultiplexer demultiplexes the noise signal and the second sub-signal from the second multiple signal input from the sub-terminal, and
the noise component includes a first noise component included in the first main signal, the noise reducer reduces the first noise component by using the noise signal demultiplexed by the demultiplexer.

3. The reception device according to claim 1, wherein
the main signal includes a first main signal, the first main signal is input to the main terminal, the broadcast wave includes a first broadcast wave of a first frequency band, and the first main signal includes the first broadcast wave,
the multiple signal includes a first multiple signal, the sub-signal includes a first sub-signal, the first multiple signal is input to the sub-terminal, the first multiple signal is obtained by multiplexing the noise signal and the first sub-signal, and the first sub-signal includes the first broadcast wave,
the demultiplexer demultiplexes the noise signal and the first sub-signal from the first multiple signal input from the sub-terminal, and
the noise component includes a first noise component included in the first main signal, and the noise reducer reduces the first noise component by using the noise signal demultiplexed by the demultiplexer.

4. The reception device according to claim 3, wherein the noise reducer generates a reception signal in which the noise signal is reduced based on: (i) a synthesis signal obtained by synthesizing the first main signal and the first sub-signal; and (ii) a reduction signal obtained by reducing the noise component included in the first main signal by using the noise signal.

5. The reception device according to claim 4, wherein the noise reducer:
compares signal-to-noise ratios of the synthesis signal and the reduction signal with each other; and
selects one of the synthesis signal and the reduction signal, which has a higher signal-to-noise ratio, to use as the reception signal.

6. The reception device according to claim 4, wherein the noise reducer includes:
a first operator that generates a first operation signal according to a first coefficient based on the first sub-signal demultiplexed by the demultiplexer;
a second operator that generates a second operation signal according to a second coefficient based on the noise signal demultiplexed by the demultiplexer; and
a generator that synthesizes the first operation signal and the first main signal to generate the synthesis signal, and reduces the first main signal by the second operation signal to generate the reduction signal, and
the demultiplexer includes:
a first adjuster that sets the first coefficient based on the first main signal and the first sub-signal; and
a second adjuster that sets the second coefficient based on the first main signal and the noise signal.

7. The reception device according to claim 5, wherein the noise reducer includes:
a first operator that generates a first operation signal according to a first coefficient based on the first sub-signal demultiplexed by the demultiplexer;
a second operator that generates a second operation signal according to a second coefficient based on the noise signal demultiplexed by the demultiplexer; and
a generator that synthesizes the first operation signal and the first main signal to generate the synthesis signal, and reduces the first main signal by the second operation signal to generate the reduction signal, and
the demultiplexer includes:
a first adjuster that sets the first coefficient based on the first main signal and the first sub-signal; and
a second adjuster that sets the second coefficient based on the first main signal and the noise signal.

8. A reception method comprising:
receiving a main signal through a main terminal, the main signal including a broadcast wave;
receiving a multiple signal through a sub-terminal, the multiple signal being obtained by multiplexing a noise signal and a sub-signal including the broadcast wave;
demultiplexing the noise signal and the sub-signal from the multiple signal that is input from the sub-terminal; and
reducing a noise component included in the main signal by using the noise signal.

9. A wireless apparatus comprising:
a main antenna that receives a main signal including a broadcast wave;
a sub-antenna that receives a sub-signal including the broadcast wave;
an antenna that receives a noise signal;
a sub-signal cable that transmits a multiple signal obtained by multiplexing the noise signal received by the antenna and the sub-signal received by the sub-antenna;
a demultiplexer that demultiplexes the noise signal and the sub-signal from the multiple signal transmitted through the sub-signal cable; and
a noise reducer that reduces a noise component included in the main signal by using the noise signal demultiplexed by the demultiplexer.

10. The wireless apparatus according to claim 9, further comprising:
a multiplier that multiplies the noise signal received by the antenna on the sub-signal received by the sub-antenna to generate the multiple signal.

11. The wireless apparatus according to claim 9, wherein the antenna is arranged in a position that is closer to a noise source emitting the noise signal than a position at which the main antenna is arranged.

12. The wireless apparatus according to claim 10, wherein the antenna is arranged in a position that is closer to a noise source emitting the noise signal than a position at which the main antenna is arranged.

* * * * *